(12) United States Patent
Dobberkau et al.

(10) Patent No.: US 6,448,893 B1
(45) Date of Patent: Sep. 10, 2002

(54) MULTIFUNCTION DISPLAY ARRANGEMENT FOR A MOTOR VEHICLE

(75) Inventors: Thomas Dobberkau, Meine; Dieter Kriegel, Adenbüttel; Klaus-Gert Besel, Sickte; Frank Golisch, Braunschweig; Olaf Lengfeld, Calberlah, all of (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/145,406

(22) Filed: Sep. 2, 1998

Related U.S. Application Data

(63) Continuation of application No. PCT/EP97/00809, filed on Feb. 19, 1997.

(30) Foreign Application Priority Data

| Mar. 2, 1996 | (DE) | 196 08 101 |
| Mar. 2, 1996 | (DE) | 196 08 103 |
| Jun. 18, 1996 | (DE) | 196 24 225 |

(51) Int. Cl.[7] ............................................. B60Q 1/00
(52) U.S. Cl. .................... 340/461; 340/462; 248/349.1; 248/131
(58) Field of Search ................ 340/461, 438, 340/462; 248/349.1, 131

(56) References Cited

U.S. PATENT DOCUMENTS

| 4,225,005 A | 9/1980 | Okabayashi |
| 4,521,078 A | 6/1985 | Baeger ........................ 350/334 |
| 4,724,918 A | 2/1988 | Raineri ........................ 180/90 |
| 4,983,951 A * | 1/1991 | Igarashi et al. .............. 340/461 |
| 5,288,558 A | 2/1994 | Nöthe ........................ 428/426 |
| 5,457,575 A | 10/1995 | Groves et al. .............. 359/631 |
| 5,687,944 A * | 11/1997 | Shon ........................ 248/349.1 |
| 5,873,557 A * | 2/1999 | Schilling et al. ......... 248/349.1 |

FOREIGN PATENT DOCUMENTS

| DE | 3628333 | 3/1988 |
| DE | 3830695 | 8/1990 |
| DE | 4100831 | 8/1991 |
| DE | 4117257 | 12/1992 |
| DE | 4213129 | 10/1993 |
| DE | 4328564 | 8/1994 |
| DE | 4425204 | 1/1996 |
| EP | 0233844 | 8/1987 |
| EP | 0 338 405 A2 | 10/1989 |
| EP | 0659010 | 6/1995 |
| WO | 9307418 | 4/1993 |

OTHER PUBLICATIONS

"Ein Audio–und Videosystem" by Harald Bochmann; Radio Fernsehen Elektronik, vol. 42, No. 11, Nov. 1993, Berlin, pp. 20–23, XP000466219; See p. 21, col. 2, line 3, p. 22, col. 3, line 34; Figures 10,12.

G. Bartholomai, Ergnomische Bewertung der Abesbarkeit digitaler und quasianaloger Instrumente bei verschiedenen Lichtverthaltnissne, VDI–Berichte Nr. 744, 1989, 7 pages (German language text).

* cited by examiner

*Primary Examiner*—Daryl Pope
(74) *Attorney, Agent, or Firm*—Baker Botts LLP

(57) ABSTRACT

A multipurpose display arrangement for a motor vehicle includes an electronic display device for displaying information and at least one control element. The multipurpose display arrangement is located in an aperture in the vehicle instrument panel in the visual range of the vehicle driver. In order to minimize reflections and dazzle on the display surface which are caused by the incident light and/or bright surfaces inside the vehicle, the electronic display device is mounted so as to be pivotable in at least two axes in the instrument panel aperture.

19 Claims, 6 Drawing Sheets

MULTIFUNCTION DISPLAY ARRANGEMENT FOR A MOTOR VEHICLE

REFERENCE TO RELATED APPLICATION

This application is a continuation of International Application No. PCT/EP97/00809 filed Feb. 19, 1997.

BACKGROUND OF THE INVENTION

This invention relates to multifunction display arrangements for motor vehicles which include an electronic display unit having a picture screen to display information in the form of signs and symbols and at least one control member within the driver's field of view in a part of the interior trim of the vehicle.

Increased traffic density and the desire of vehicle users for greater comfort have led to numerous electronic accessories in motor vehicles, such as guidance, warning, audio systems and mobile radios which provide large quantities of information and messages to be supplied to the operator. For presentation of such information, electronic display units, especially in the form of monitors or picture screens, which are increasingly coming into use, have the advantage that different data sets can be presented in time sequence at the same location. The reception of such a large quantity of information is necessary for the driver's operation of the vehicle but causes a diversion of the driver's attention from the road while reading the screen. For this reason, the duration of any such diversions must be kept as short as possible.

Various lighting conditions, incident light on the display screen and light or images reflected from the display screen may interfere seriously with reading of the displayed information. This results in a diversion of the vehicle driver's attention for time durations that are often unwarranted in terms of safety.

To reduce light reflection from picture screens or monitors, for example, U.S. Pat. No. 5,288,558 and German Offenlegungsschrifts Nos. 41 00 831 and 41 17 257 disclose the application of antireflection coatings either directly to the surface of a display screen or to a sheet of glass in front of it.

To provide a display in a motor vehicle, U.S. Pat. No. 4,521,078 further discloses arranging the display surface of the display screen at an angle between the display surface and the direction of the viewer's gaze which is different from 90° to prevent specular and other reflections, and presenting characters on the inclined display surface which are distorted in such a way that they are viewed without distortion by the user.

Further, to diminish specular reflection in the display surface of a display unit in a motor vehicle, German Offenlegungsschrift No. 44 25 204 discloses a covering glass for a display screen which is oriented so that, from a driver's average viewpoint, a portion of the instrument panel located in front of the display unit is reflected by the glass.

Because vehicle users have different stature and use different seat adjustments, however, such solutions do not always provide the desired result with every driver.

SUMMARY OF THE INVENTION

Accordingly, it is an object of the present invention to provide a multifunction display arrangement for a motor vehicle which overcomes disadvantages of the prior art.

Another object of the invention is to provide a multifunction display arrangement which, considering a vehicle user's individual ergonomy and the lighting conditions under which the vehicle is operated in each instance, is easily readable because the effects of light shining into the vehicle and/or specular and other reflections from light-colored interior surfaces can be avoided to a large extent or even eliminated completely.

These and other objects of the invention are attained by providing a multifunction display arrangement having a display screen which is supported for pivotal motion on at least two axes.

According to the invention, at least the electronic display unit of the multifunction display arrangement may be mounted in an aperture of the interior vehicle trim, pivotably on at least two axes, preferably a vertical and a horizontal axis, to improve readability.

This has the advantage that, beside permitting an optimal orientation of the display screen in relation to directly incident light, the display unit may be adjusted with respect to reflected light colored areas or surfaces in the motor vehicle to provide a viewing or reading direction which is convenient to the user.

In accordance with one embodiment of the invention, the electronic display screen is part of a structural unit which also contains a control member or members, in which case the entire unit may advantageously be pivotable on the two axes.

Preferably for design reasons the angle through which the electronic display unit is pivotable in the aperture of the interior trim is no more than about 10–20° on each axis.

The pivotal suspension of the electronic display screen or unit may be achieved in many different ways. Thus, in one embodiment, the display screen or unit is pivotable about a mounting constructed, for example, in the manner of a ball-and-socket joint. In this case, a socket member is provided in which a ball member, having the configuration of a partial or complete sphere, is rotatably held so that, upon pivoting of the display screen or unit about the joint, individual points of the picture screen surface follow a spherical motion path having a center of curvature which is located more or less at the center of symmetry of a picture screen surface of rectangular, oval or circular shape. For this purpose, according to another aspect of the invention, the center of rotation for the mount consisting of a socket element and a ball element is in the region of the surface of the multifunction display screen. For a display screen or unit mounted in a housing so that the picture screen surface is substantially flush with the front of the housing, the center of rotation is thus moved into the region of the screen. The center of rotation can be positioned to the front or rear of the screen, depending on the application, to the extent that the mobility of the display screen or unit as a whole is not unduly impaired. In the ideal case, however, the center of rotation is located exactly at the picture screen surface. The socket element and the ball element may be associated either with the movable display screen or unit or, at least indirectly, with the interior trim.

According to another embodiment, the display screen or display unit of the multifunction display arrangement is pivotable about a position which is essentially flush with the front of the housing in a mounting constructed, for example, in the manner of a telescoping ball-and-socket joint. For example, at least three socket elements are provided, in which ball elements in the form of partial or complete spheres at the ends of movable piston rods are rotatably held and are also displaceable lengthwise perpendicular to the normal position of the display screen so that, by appropriate pressure on the display screen or unit, the position can be adjusted to the direction of view of a user. Because the screen or unit is supported at several positions, individual adjustability to the needs of the user and to prevailing visibility and lighting conditions is possible.

It will be understood that the components of the ball-and-socket mountings may be reversed if desired, that is, the end portions of the piston rods may be in the form of socket elements, and the corresponding ball elements may be affixed to the rear of the display screen or unit. Reversing the components of the ball-and-socket mounting in this manner will not limit the mobility of the display screen or unit.

In an advantageous modification of this embodiment, coupling arrangements are provided to connect bearing mounts. Coupling of the bearing mounts may be accomplished by various mechanisms, for example mechanical linkages such as cables, hydraulic lines, electrical servo motors and the like. Because of the linkages of the bearing mounts, at least when coordinated in pairs, the axis of rotation of the display screen or unit is located at the midpoint of a line connecting the coupled bearing mounts, in other words a line parallel to the visible surface of the display screen or unit. An advantage of coupling the bearing mounts is that only pressure need be applied to adjust the display screen or unit. The distance over which piston rods acted upon by the applied pressure are moved into the housing is compensated by motion of the coupled bearings in the opposite direction. Thus an over-all motion of the display screen or unit to a position into the interior of the housing is prevented. Furthermore, no handles or gripping devices need be attached to the display screen or unit to effect a motion of a portion of the display screen or unit toward the user.

As one example, the coupling between bearing mounts may be effected by Bowden cables or the like. The use of commercially avialable Bowden cables or the like provides an economical, well-tried, dependable and easily replaced mechanism. Because of the built-in flexibility of these devices, their placement can be adapted to the requirements of the housing interior.

Further, by connecting the bearing mounts through fluid lines, hydraulic coupling can be effected and the hydraulic channels can be integrated to special advantage into the housing walls so that they require no space in the interior of the housing and the walls are not burdened by connections or holders. Also, the use of hydraulic couplings provides the possibility of intercoupling all the bearing locations and thus generating a center of rotation of the display screen or unit in the center of the area bounded by the end points of the bearing mounts.

It is also of advantage that, by suitable choice of viscosity of the hydraulic coupling, adjustable damping can be achieved. Thus, the display unit can be arranged so that it can only be pivoted slowly, avoiding any unintentional shifting of the display unit beyond a desired position. Furthermore, the damping effect of the hydraulic fluid prevents automatic restoration of the display unit to its normal position, so that a selected setting is maintained.

Pivoting of the display screen or unit by way of electrical signal detectors, signal emitters and servo elements advantageously assures that there need be no restriction as to placement of the conductors inside the housing. The conductors may either be integrated in the housing wall or laid along the wall. The use of servo elements permits a spatial separation of a control element and the display screen or unit, much like that of electrically operable window drives and outside mirrors. The control element may, for example, be mounted in the vicinity of the vehicle steering wheel so that a driver need not move a hand to the display unit while driving.

In another advantageous embodiment a multi-function display arrangement has a housing frame mounted in the interior vehicle trim and arranged to accommodate the movable mounting of the display unit. Such a multifunction display arrangement may be mounted as a complete module, for example, into an instrument panel or a central console. Alternatively, however, it is possible to configure the trim part as a housing for the display unit.

Because of the small structural depth of the display unit mount and its good angular adjustability, application of the invention to other information media is possible. Installation for example of one or more display screens or units in the backrest or headrest for the front seats to exhibit television programs or as a computer picture screen may be advantageously effected.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
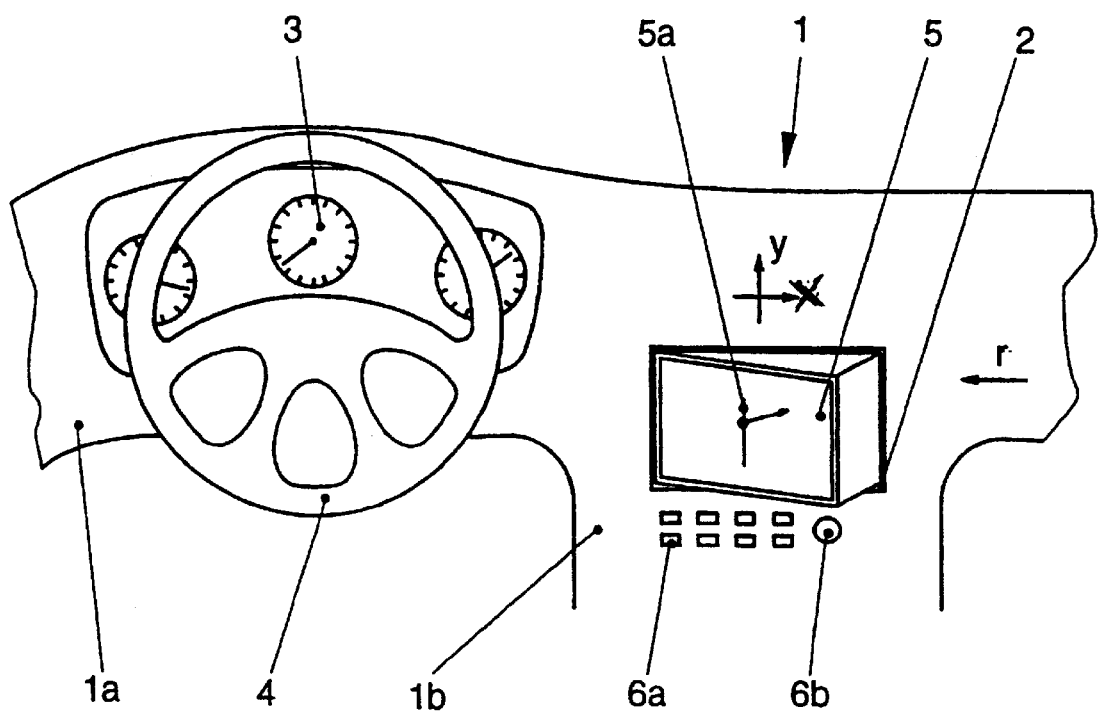
FIG. 1 is a fragmentary view illustrating a portion of an instrument panel of a motor vehicle containing a representative embodiment of a display arrangement according to the invention, in particular a picture screen, pivoted on a vertical axis.

In the typical embodiment of the invention shown in FIG. 1, a portion of an instrument panel 1 of a motor vehicle is shown from the point of view of the driver's seat. A region 1a of the instrument panel 1 facing the driver's seat includes a display element 3 in the form of a pointer instrument and a steering wheel 4 as well as a central console 1b. A portion 2 of the central console accommodates a picture screen 5 of a multifunction display arrangement and includes an operating member 6 consisting of keys 6a and a rotary switch 6b arranged below the portion 2. Using the keys 6a, various accessories in the motor vehicle, such as a navigating instrument, audio instruments or a mobile radio, can be selected for operation. The rotary switch 6b operates the particular accessories selected. An information display 5a which is necessary for operation of the accessories is presented to the user on the picture screen.

In FIG. 1, the picture screen 5 has been turned on its vertical axis y toward the driver's seat to improve contrast. In this embodiment, this is accomplished by applying gentle pressure of the finger on the side of the picture screen frame facing the driver's seat. By this measure, for example, contrast on the surface of the picture screen can be improved if light is incident in the direction of the arrow r.

Figure 2:
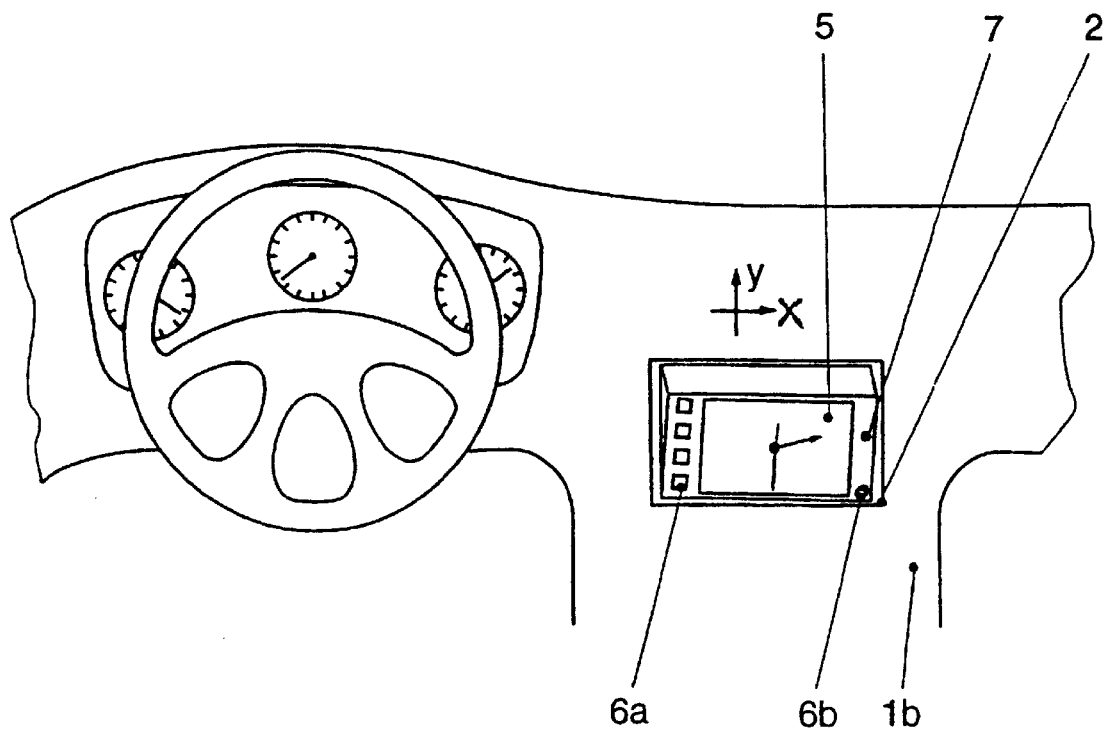
FIG. 2 is a view similar to FIG. 1 showing a portion of an instrument panel of a motor vehicle with a combined display screen and operating unit pivotable on a horizontal axis.

In the multifunction display arrangement illustrated in FIG. 2, the picture screen 5 is included in a display unit 7 together with the operating elements 6, which again consist of keys 6a and a rotary switch 6b, the unit 7 being pivotably supported for motion in two axes x and y in the aperture 2 of the central console 1b. The integration of the picture screen 5 and the operating members 6 in a display unit 7 enhances operability of the multifunction display arrangement since there is no danger that the operating members 6 may become invisible or difficult of access when the display unit containing the picture screen 5 is pivoted. In FIG. 2, the display unit 7 has been turned on its horizontal axis x by applying pressure at the bottom of the unit to minimize reflections due to light incident on the screen 5 through the windows, not shown, of the vehicle. Also, the unit 7 can be optimally adjusted in this way to be convenient to a user's direction of view.

Figure 3:
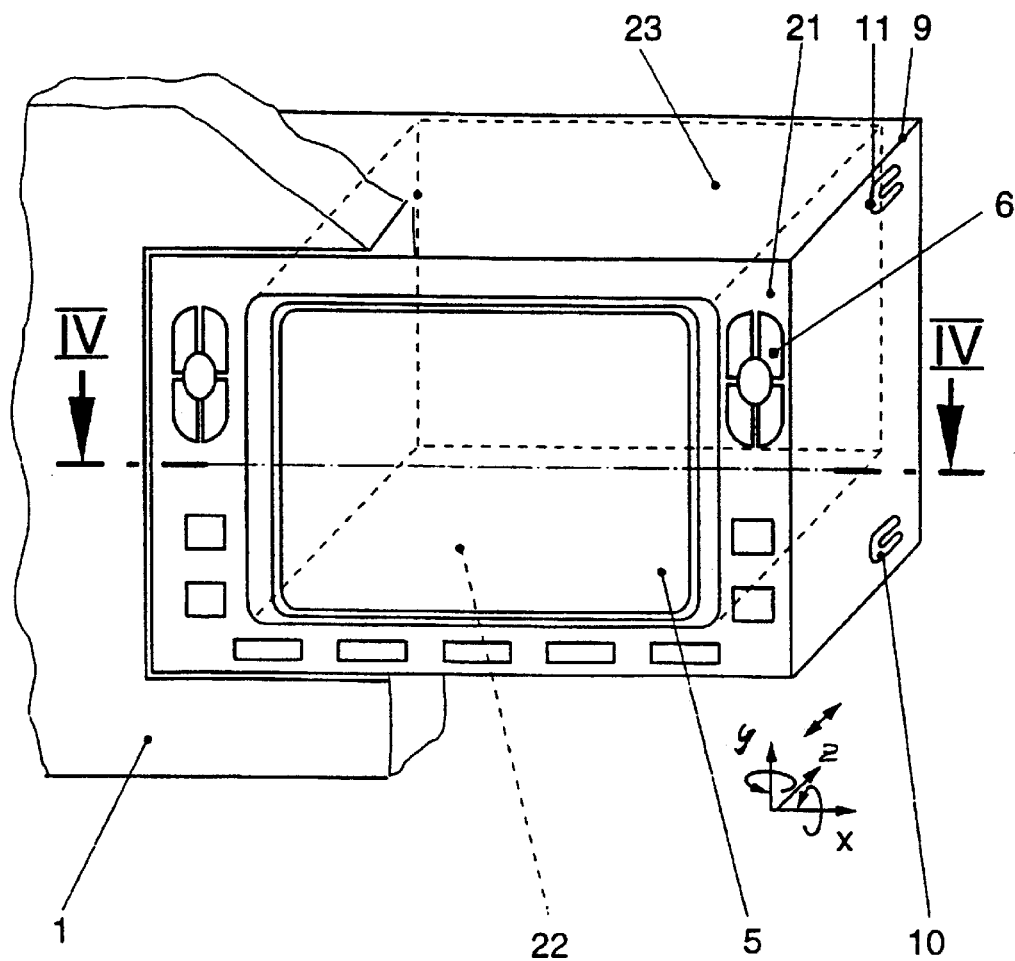
FIG. 3 is a perspective view showing a multifunction display arrangement as viewed by a vehicle user.
Figure 4:
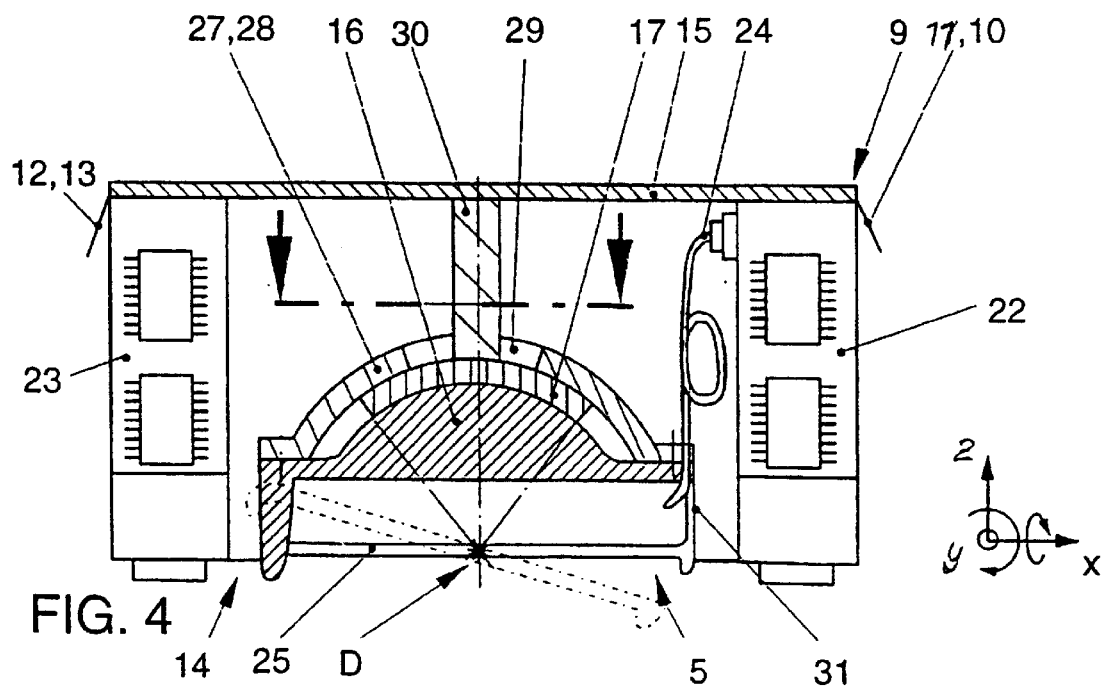
FIG. 4 is a sectional view of the multifunction display arrangement shown in FIG. 3, taken along the line IV—IV of FIG. 3.
Figure 5:
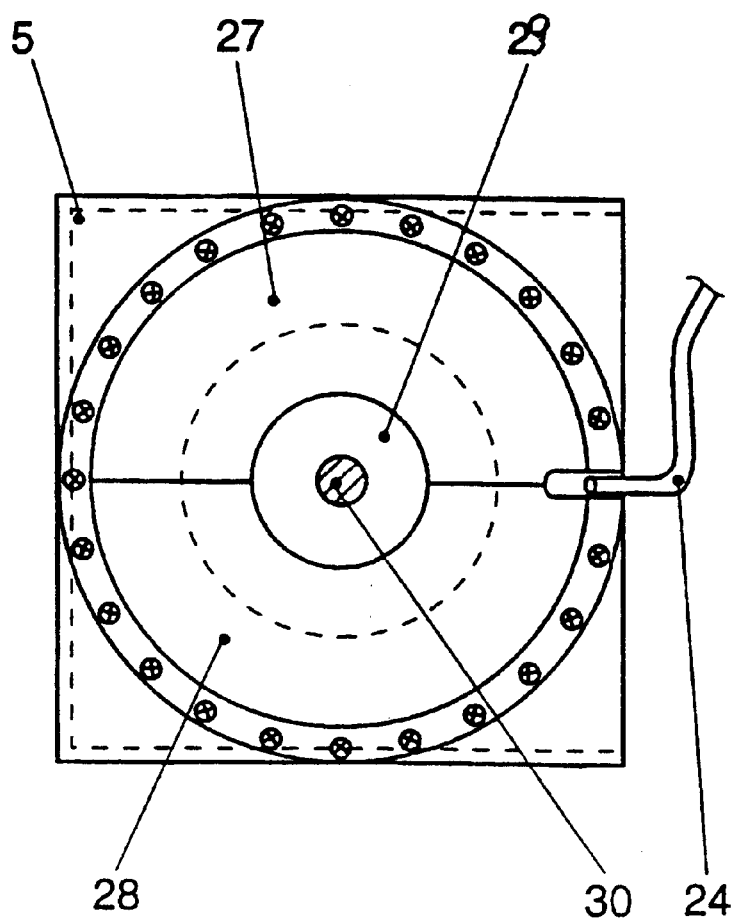
FIG. 5 is a sectional view taken on the line V—V of FIG. 4.

FIG. 3 shows a multifunction display arrangement built into an instrument panel 1, which is only partially illustrated. A display screen 5 is pivotable about axes x and y, singly or jointly, within a housing frame 9. At the front 21 of the housing frame 9, several operating members 6 are provided in a conventional manner. The complete multifunction display arrangement has the configuration of a drawer module, and includes tabs 10 and 11 of the type used for mounting of vehicle radios, to secure the display unit in a frame (not shown) which is associated with the instrument panel 1. As shown in FIG. 4, similar tabs 12 and 13 are located on the opposite side of the housing frame 9, which is not visible in FIG. 3.

The internal structure of a representative embodiment of the multifunction display arrangement according to the invention is illustrated in FIG. 4. As there shown, the housing frame 9 has a front portion 14, a back wall 15, and lateral function compartments 22 and 23 holding electronic components which are only schematically indicated. These components can be controlled by the operating members mounted in the front portion 14. If desired the components may also be supplied with external control signals from remote sensors or by radio transmission. A transmission line 24 supplies the display unit with operating signals and is also capable of transmitting information signals from the electronic components to the display unit where they are displayed on the screen 5.

In this embodiment a ball element 16, in the form of a partial sphere, is supported for rotation about the axes x and y, singly or jointly, by a socket element 17 which is affixed to the back wall 15 by a pin 30. The radius of curvature of the engaging surfaces of the ball and socket is chosen so that a center of rotation D is located in the region of the picture screen surface 25. Thus, inside an opening 26 in the housing frame 9, the display unit 5 can be pivoted in such a way that the inner walls of the function compartments 22 and 23 are not touched by the rotatable unit, even for relatively large angles of rotation. To provide a defined maximum limit to the angle of motion, guide shells 27 and 28 are provided which, as part of the supporting stand accommodating the display screen 5, form a circular aperture 29 surrounding a pin 30 by which the ball 16 is affixed to the back wall 15. In the maximum angular positions, the pin 30 affixed to the back wall 15 engages the edges of the aperture 29 in the socket element 17. In an especially advantageous embodiment, the pin, ball and socket can be provided in a single subassembly made of parts which can be very economically produced by injection molding. If desired, the pin 30 and the socket element 17 may be integrated in one part, which is then attached to the back wall 15 by a screw or clip connection. It is also possible to provide an arrangement in which the inside walls of the function compartments 22 and 23 and the back wall 15 together form a spherical dish, optionally also in one piece, in which a supporting stand formed like a partial sphere is rotatably supported.

In a preferred embodiment, the ball element 16 is also an integral part of the supporting stand holding the display unit 5. The support stand is here made like a drawer receptacle, having a push-in opening in a lateral region 31. The display unit is pushed or placed into this opening and the, locked, for example by catches not shown in detail, engaging catch recesses. In this example, the bearing shells 27 and 28 are screwed to the support stand. However, mounting by clipping or plugging is also possible.

In a modification of the arrangement illustrated in FIG. 4, a socket element may be associated with the support stand of the display unit 5. The ball element and the bearing shells enclosing the socket element may then be associated either with the back wall 15, or with the inside walls of the side parts 22 and 23, or with a bottom 32 or a cover of the housing frame 9. The invention also includes embodiments in which the radius of the ball element is markedly smaller than the width of the picture screen, and the ball element is located directly behind the picture screen surface in a correspondingly small socket element.

In another embodiment, not illustrated, the entire display unit 5 is displaceable also in the z-direction, i.e., in a guide preferably designed in the manner of a mechanical flip-flop. In this way, the display unit 5 can be moved forwardly out of the housing frame 9 under especially extreme conditions of view. For this purpose, an outer frame of the display unit 5 may merely be subjected to an actuating pressure. Spring action then moves the complete display unit 5 with its mount out of the housing frame 9. For the return motion likewise, a gentle pressure on the frame is sufficient. Such flip-flop constructions are known in a variety of modifications, for example in furniture or covers and flaps on electronic equipment, and therefore will not be described in detail here.

Figure 6:
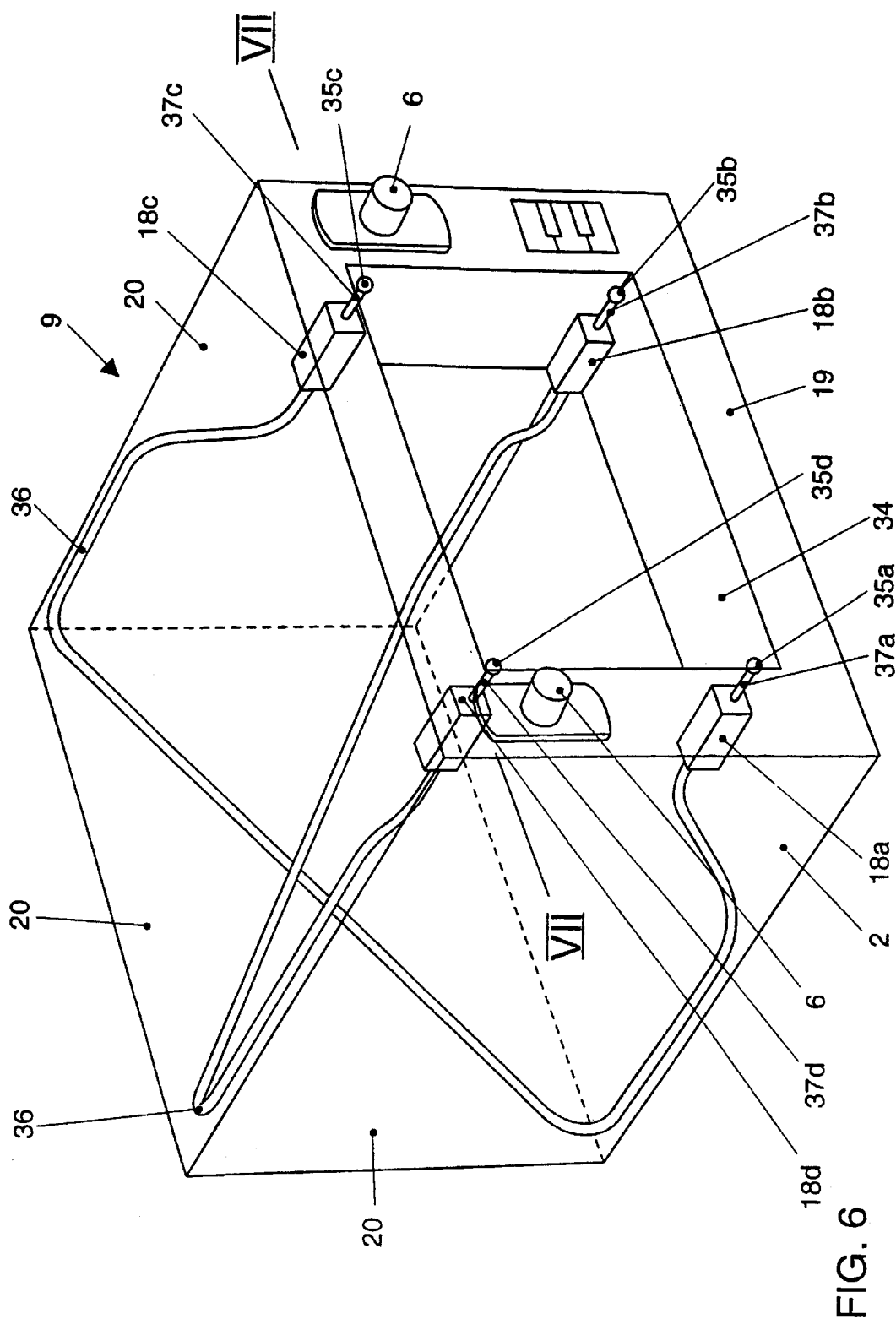
FIG. 6 is a perspective view showing a housing for a multifunction display unit as viewed by a vehicle user.
Figure 7:
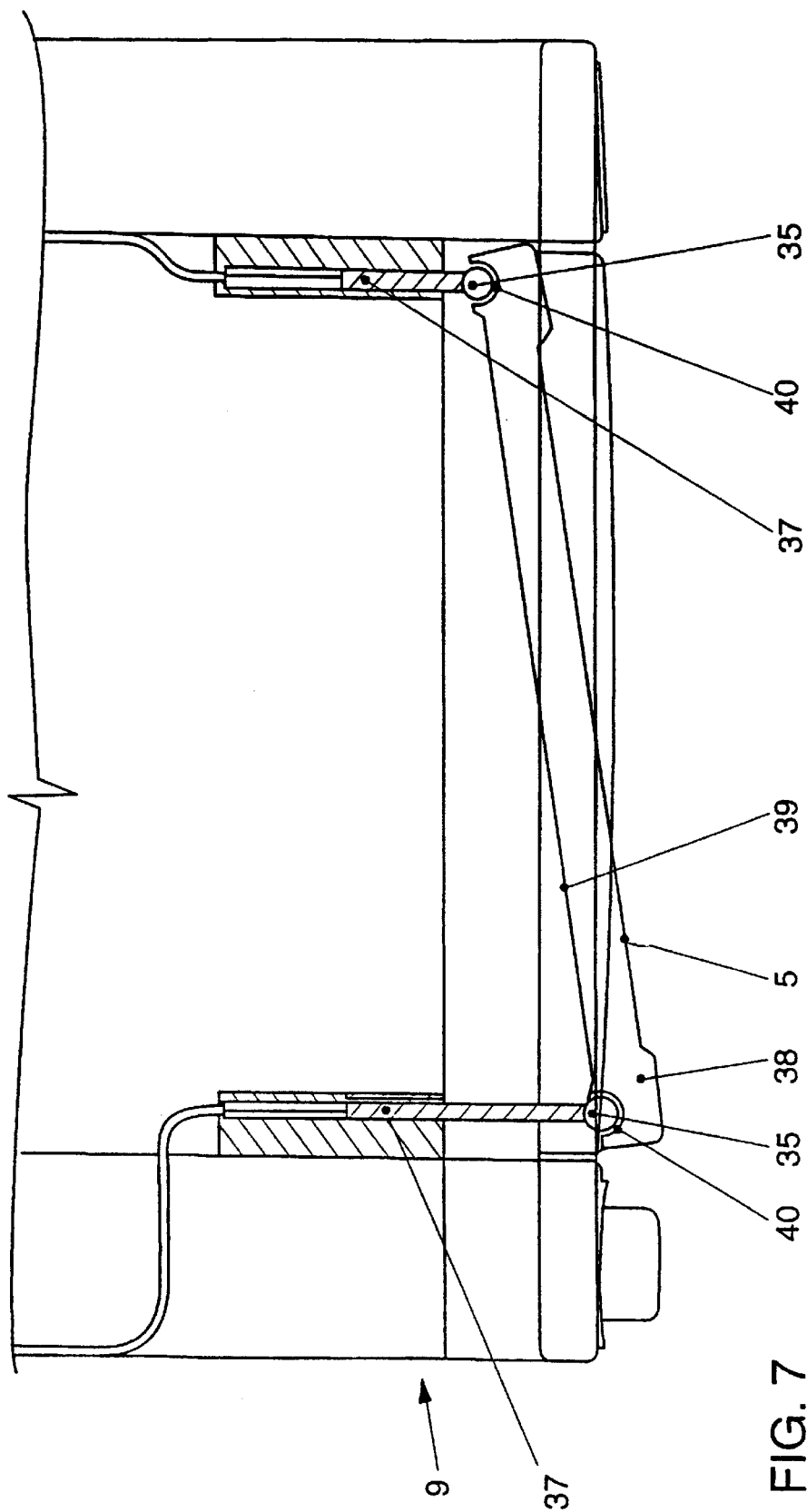
FIG. 7 is a sectional view taken on the line VI—VI of FIG. 6.

Another embodiment of a pivoting mechanism for the multifunction display arrangement is shown in FIGS. 6 and 7.

In FIG. 6, a housing arrangement, generally designated 9, for a multifunction display with housing walls 20, a housing front 19 and operating members 6 is shown, the housing arrangement 9 being represented in this view without a display unit 5. Four bearing elements 18a–d are mounted in a housing aperture 34. These elements have connections 35a–35d of spherical shape, set back behind the housing front 19, for supporting a display unit 5. In the housing 9, two coupling lines 36 are disposed in the rear and along the inside housing walls, preferably in the corner regions, for coupling two pairs of bearing locations 18a and 18c, and 18b and 18d, respectively. The coupling lines 36 cross at the rear wall of the housing so that the pairs of bearing locations are connected diagonally, or crosswise. In a preferred embodiment, hydraulic fluid is provided as working medium. In other words, the coupling of the location pairs is hydraulic. The ends of the lines 36 are connected to the bearing elements 18a–d, which constitute reservoirs and cylinders for the hydraulic fluid. The spherical connections 35a–d for supporting the display unit are mounted on piston rods 37a–d, respectively which extend perpendicular to the housing front 19. By pressure on the display unit 5, any angular setting within the pivotable range around the center of the display unit 5 can be reached.

The sectional representation in FIG. 7 shows the housing arrangement 9 of a multifunction display arrangement with a display unit 5 mounted therein. In this case the display unit comprises a frame 38 on the back 39 of the display to which the connections 35a–d (only 35c and 35d are seen in the drawing) are coupled in the manner of ball-and-socket joints. On the back, socket elements 40a–d (only 40c and 40d are visible in the drawing) are provided to receive the corresponding balls, permitting free rotary motion of the balls 35a–d in the sockets. The piston rods 37a–d (only 37c and 37d are seen in the drawing) are guided in the bearing devices 18a–d (only 18c and 18d are seen in the drawing) so as to permit linear motion. The combination of linear and rotary motions provides adjustability of the display unit about the center of the display screen 5.

It should be noted that the coupling of the bearing positions 18 may be hydraulic, electrical, cable or Bowden type, or by other mechanical linkage. The lines 36 either extend along the housing wall or, in embodiments not shown in the drawing, are integrated with the housing wall, or a combination of both. Advantageously, the bearing members 18 are coupled crosswise diagonally. In other embodiments the coupling may be in parallel pairs through a common system of lines or otherwise.

Figure 8:
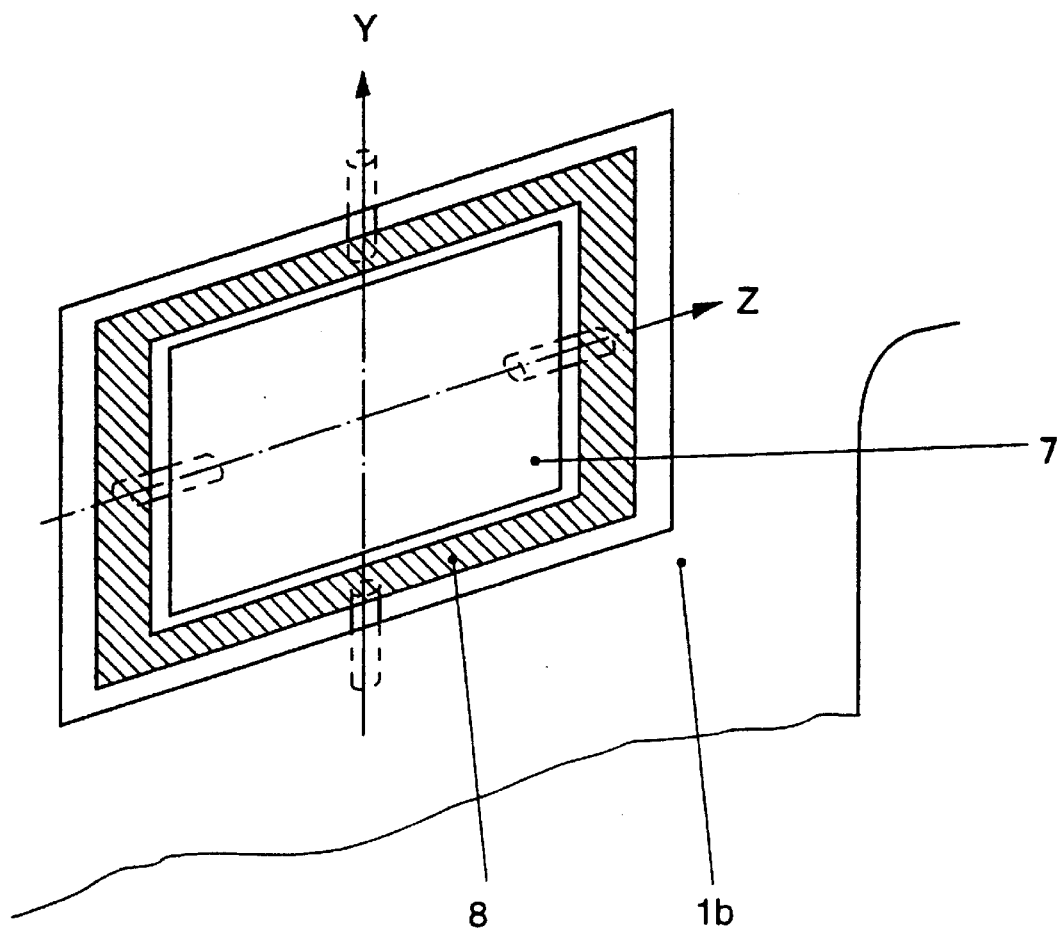
FIG. 8 is a schematic view showing a universal mount for an electronic display unit.

FIG. 8 shows another example of a pivotable mounting of the display unit 7, using a universal gimbal mount suspension mechanism. The display unit 7 is mounted in an accessory housing 8, in which the display unit is pivotable about a horizontal axis x. The accessory housing 8 is in turn pivotable about a vertical axis y in the aperture 2 in the central console 1b, thereby providing pivotability of the unit 7 in both the horizontal and the vertical direction.

Although the invention has been described herein with reference to specific embodiments, many modifications and variations therein will readily occur to those skilled in the art. Accordingly, all such variations and modifications are included within the intended scope of the invention.

We claim:

1. A multifunction display arrangement for a motor vehicle comprising electronic display means including a picture screen for representation of data, at least one operating element for the display means, and mounting means for mounting the display means in a part of the interior trim of a motor vehicle within an operator's field of vision, wherein the mounting means supports the display means for pivotal motion on at least two axes generating a combined center of rotation in the vicinity of the center of the picture screen to improve visibility to an operator.

2. A multifunction display arrangement according to claim 1 wherein the display means comprises a display unit containing a display screen and at least one operating element.

3. A multifunction display arrangement according to claim 2 wherein the display unit is mounted pivotably on at least two axes.

4. A multifunction display arrangement according to claim 1 including a housing enclosing the display unit, the housing being inserted in an aperture of the interior trim, and wherein the display unit is mounted in the aperture for pivotal motion about at least two axes.

5. A multifunction display arrangement according to claim 4 wherein the housing contains at least one operating element for the electronic display means.

6. A multifunction display arrangement according to claim 1 wherein the display means is supported for pivotal motion about vertical and horizontal axes.

7. A multifunction display arrangement according to claim 1 wherein the display means is supported for pivotal motion through a maximum angle of 20°.

8. A multifunction display arrangement according to claim 1 wherein the display means is pivotal either by pressure on a surface of the display means or by operation of a switch.

9. A multifunction display arrangement according to claim 1 wherein the display means is automatically pivotable in response to sensor signals.

10. A multifunction display arrangement according to claim 1 wherein the display means is pivotably supported by at least one ball-and-socket joint.

11. A multifunction display arrangement according to claim 10 wherein the ball-and-socket joint comprises at least one socket element in which a ball element is rotatably supported and wherein one of the socket element and the ball element is supported from the interior trim and the other of the ball element and the socket element supports the display means.

12. A multifunction display arrangement according to claim 1 wherein an aperture in the interior trim has a front and side walls and at least three bearing members are provided supporting the display means, each bearing member being displaceable in a direction substantially perpendicular to the front of the aperture.

13. A multifunction display arrangement according to claim 12 wherein four bearing elements are located in corner regions of a housing within the aperture.

14. A multifunction display arrangement according to claim 12 wherein at least two of the bearing elements are cooperatively connected to each other by a coupling.

15. A multifunction display arrangement according to claim 14 wherein the coupling is a cable or hydraulic coupling.

16. A multifunction display arrangement according to claim 14 wherein the bearing elements are arranged rectangularly substantially in one plane and the coupling is between diagonally opposed elements.

17. A multifunction display arrangement according to claim 14 wherein the bearing elements connected by the coupling are at least partly located behind the display means.

18. A multifunction display arrangement according to claim 14 wherein the bearing elements connected by the coupling are integral components of at least segments of a wall.

19. A multifunction display arrangement according to claim 1 wherein the display means is pivotally supported in an aperture in the trim by a gimbal mount.

* * * * *